(12) United States Patent
Dalio et al.

(10) Patent No.: US 11,355,030 B2
(45) Date of Patent: Jun. 7, 2022

(54) SYSTEM AND METHOD FOR TEACHING COMPUTER PROGRAMMING

(71) Applicant: ENDLESS OS LLC, Westport, CT (US)

(72) Inventors: Matthew Dalio, San Francisco, CA (US); Cosimo Cecchi, San Francisco, CA (US); Simon Schampijer, San Francisco, CA (US); Jonathan Bacon, San Francisco, CA (US); Thomas Samuel Grafton Spilsbury, Espoo (FI)

(73) Assignee: ENDLESS OS LLC, Westport, CT (US)

( * ) Notice: Subject to any disclaimer, the term of this patent is extended or adjusted under 35 U.S.C. 154(b) by 168 days.

(21) Appl. No.: 16/552,822

(22) Filed: Aug. 27, 2019

(65) Prior Publication Data
US 2021/0065578 A1     Mar. 4, 2021

(51) Int. Cl.
*G09B 19/00* (2006.01)
*G06F 3/0481* (2022.01)
(Continued)

(52) U.S. Cl.
CPC ....... *G09B 19/0053* (2013.01); *G06F 3/0481* (2013.01); *G06F 3/04845* (2013.01); *G09B 5/02* (2013.01); *G06F 3/0489* (2013.01)

(58) Field of Classification Search
CPC .............. G06F 3/0481; G06F 3/04845; G09B 19/0053
See application file for complete search history.

(56) References Cited

U.S. PATENT DOCUMENTS

2008/0250344 A1  10/2008  Yoshida
2016/0093232 A1*  3/2016  Chong ............... G09B 19/06
                                                          434/118
(Continued)

FOREIGN PATENT DOCUMENTS

WO     2008095787 A1     8/2008

OTHER PUBLICATIONS

PCT International Search Report and Written Opinion of the International Searching Authority: Application No. PCT/US20/48220; Completed: Oct. 21, 2020; dated Nov. 17, 2020; 7 Pages.
(Continued)

*Primary Examiner* — David E Choi
(74) *Attorney, Agent, or Firm* — Whitmyer IP Group LLC

(57) ABSTRACT

A system for teaching computer programming includes a computer, a display connected to the computer, software executable by the computer to generate a window on the display, and a user input for transitioning the window between a first configuration and a second configuration. In the first configuration, the window displays an application. In the second configuration, the window displays a programming interface for the application. The system further includes an editor displayed in the programming interface for changing a code listing related to a parameter of a feature displayed in the application. By changing the code listing related to the parameter of the feature and transitioning between the first configuration and the second configuration, a user is able to observe how differences in the code listing affects the parameter of the feature in the application.

16 Claims, 7 Drawing Sheets

(51) Int. Cl.
*G09B 5/02* (2006.01)
*G06F 3/04845* (2022.01)
*G06F 3/0489* (2022.01)

(56) References Cited

U.S. PATENT DOCUMENTS

| | | |
|---|---|---|
| 2016/0284232 A1* | 9/2016 | Sisamos .................. G09B 5/02 |
| 2017/0102857 A1* | 4/2017 | Badiger ........... H04N 21/21805 |
| 2017/0186336 A1 | 6/2017 | Chong et al. |
| 2018/0349114 A1* | 12/2018 | Brown .................. G06N 20/00 |
| 2020/0293431 A1* | 9/2020 | Dippon ............... G06F 11/3684 |
| 2021/0065578 A1* | 3/2021 | Dalio .................... G06F 3/0481 |

OTHER PUBLICATIONS

International Preliminary Report on Patentability; Application No. PCT/US2020/048220; dated Sep. 25, 2021; 40 Pages.

* cited by examiner

SYSTEM AND METHOD FOR TEACHING COMPUTER PROGRAMMING

TECHNICAL FIELD

Aspects of the present invention generally relate to a system and method for teaching computer programming, and more particularly relate to a system and method that enables a user to directly reprogram parameters of features in an application, immediately see the results of their programming changes, and thereby learn computer programming.

BACKGROUND

A key focus of education policy in the United States is on maintaining a citizenry that is well-versed in the science, technology, engineering and mathematics (STEM) fields. This is especially true with respect to the STEM field of computer programming. The United States has struggled with a shortage of skilled workers and inadequate education in this area.

A number of attempts have been made to create educational devices or software to improve computer literacy and cultivate an interest in computer programming for children. However, none of these tools have been widely adopted. A common problem with these tools is that their ultimate purpose (i.e., learning) is too readily apparent to children, despite efforts to disguise learning features in a game-like environment.

Although children spend ever-increasing amounts of time using computers and smartphones, they generally prefer social media and entertainment applications over learning applications. Unfortunately, the applications that children most frequently use are not designed to teach them about underlying computer code. In fact, most applications are closed-source, which means it is not even possible for children to inspect (let alone change) the underlying computer code.

Another problem with prior art systems for teaching computer programming is that they fail to enable a user to directly reprogram parameters of features in an application and immediately see the results of their programming changes.

Aspects of the present invention are directed to these and other problems.

SUMMARY

According to an aspect of the present invention, a system for teaching computer programming includes a computer, a display connected to the computer, software executable by the computer to generate a window on the display, and a user input for transitioning the window between a first configuration and a second configuration. In the first configuration, the window displays an application. In the second configuration, the window displays a programming interface for the application. The system further includes an editor displayed in the programming interface for changing a code listing related to a parameter of a feature displayed in the application. By changing the code listing related to the parameter of the feature and transitioning between the first configuration and the second configuration, a user is able to observe how differences in the code listing affects the parameter of the feature in the application.

According to another aspect of the present invention, a system for teaching computer programming includes a computer, a display connected to the computer, software executable by the computer to generate a window on the display, and a user input for transitioning the window between a first configuration and a second configuration. In the first configuration, the window displays an application. In the second configuration, the window displays a programming interface for the application. The system further includes an editor displayed in the programming interface for changing respective code listings related to respective parameters of the plurality of features. By changing the respective code listings and transitioning between the first configuration and the second configuration, a user is able to observe how differences in the respective code listings affects the respective parameters of the plurality of features in the application.

According to another aspect of the present invention, a method for teaching computer programming includes the following steps: executing software to generate a window on a computer display; providing a user input for transitioning the window between a first configuration, in which the window displays an application, and a second configuration, in which the window displays a programming interface for the application; displaying a feature in the application; changing a code listing related to a parameter of the feature; transitioning between the first configuration and the second configuration via the user input; and observing how differences in the code listing affects the parameter of the feature in the application.

In addition to, or as an alternative to, one or more of the features described above, further aspects of the present invention can include one or more of the following features, individually or in combination:

- a keyboard is connected to the computer, and the user input is a button on the keyboard;
- the user input is a soft button displayed in the window;
- the feature is displayed only in the application, and the editor is displayed only in the programming interface;
- in the second configuration the window displays a mirror image of at least a portion of the application displayed in the window in the first configuration;
- the software is further executable by the computer to generate a sub-window on the display, and the editor is displayed in the sub-window;
- the sub-window is displayed within the window only when the window is in the second configuration;
- the window is displayed on and is movable about a graphical user interface desktop;
- the window forms a graphical user interface desktop;
- the window rotates about an axis during transition between the first configuration and the second configuration;
- the axis is a vertical axis extending between a top edge and an opposing bottom edge of the window;
- the window appears to flip about a vertical axis during transition between the first configuration and the second configuration; and
- the parameter is a visual parameter.

These and other aspects of the present invention will become apparent in light of the drawings and detailed description provided below.

DETAILED DESCRIPTION

Figure 1:
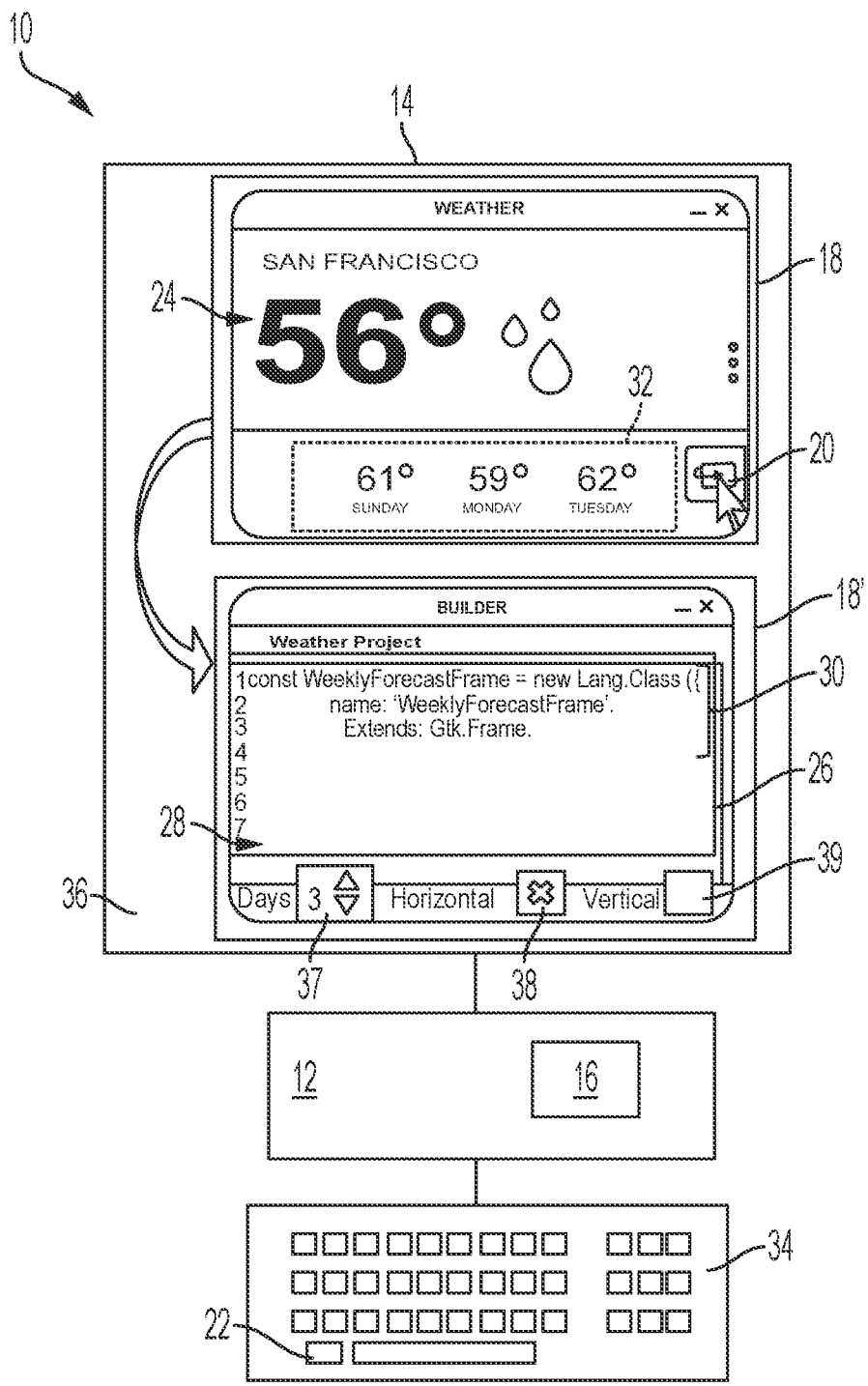
FIG. 1 schematically illustrates a system for teaching computer programming.

The present disclosure describes a system 10 and a related method for teaching computer programming. The system and method advantageously enable a user to directly reprogram parameters of features in an application, immediately see the results of their programming changes, and thereby learn computer programming.

Referring to FIGS. 1 and 5-7, the system 10 includes a computer 12, a display 14 connected to the computer 12, software 16 executable by the computer 12 to generate a window 18 on the display 14, and one or more user inputs 20, 22 for transitioning the window 18 between a first configuration and a second configuration. In the first configuration, the window 18 displays an application 24. In the second configuration, the window 18 displays a programming interface 28 for the application 24. The system 10 further includes an editor 26 displayed in the programming interface 28 for changing a code listing 30 related to at least one parameter (e.g., a visual parameter, an auditory parameter, etc.) of at least one feature 32 displayed in the application 24. By changing the code listing 30 and transitioning between the first configuration and the second configuration, a user is able to observe (e.g., visually, aurally) how differences in the code listing 30 affects the parameter of the feature 32 in the application 24.

The computer 12 and display 14 can be configured in various different ways. Referring to FIGS. 1 and 5-7, in the illustrated embodiments, the computer 12 and display 14 are in the form of a desktop computer system that further includes a keyboard 34, and the software 16 executable by the computer 12 is stored on a non-transitory computer-readable storage medium (e.g., memory) included in the computer 12. In other embodiments, the computer 12 and display 14 are in the form of a smartphone, a tablet, a laptop, or another type of computer system, and/or the software 16 is stored in the cloud or in another memory device or system remotely located relative to the computer 12.

The window 18 provides an area for user interaction with the computer 12. In the illustrated embodiments, the window 18 is displayed on and is movable about a graphical user interface desktop 36 (e.g., an operating system desktop) on the display 14. In other embodiments, the window 18 itself forms the graphical user interface desktop. The window 18 can have various different shapes; it need not be rectangular-shaped as shown in the illustrated embodiments.

The one or more user inputs 20, 22 for transitioning the window 18 between the first configuration and the second configuration can be configured in various different ways. In the illustrated embodiments, the system 10 includes a first user input 20 in the form of a soft button displayed in the window 18, and a second user input 22 in the form of a key on the keyboard 34 that is connected to the computer 12. In other embodiments, such as embodiments in which the computer 12 and the display 14 are in the form of a smartphone or tablet, the system 10 includes only one user input 20, 22 (e.g., in the form of a soft button). The one or more user inputs 20, 22 play an important role in allowing users to immediately see the results of their programming changes, which in turn facilitates learning by users.

The application 24 can be a social media application, entertainment application, game application, or another type of application. In some embodiments, the type of application 24 is selected to encourage use by children. For ease of explanation, the present disclosure describes a first embodiment (see FIGS. 1-3) having a simple application 24 for reporting weather forecasts, and a second embodiment (see FIGS. 5-7) having a simple application 24 for customizing various shapes displayed within an interactive workspace.

Figure 2:
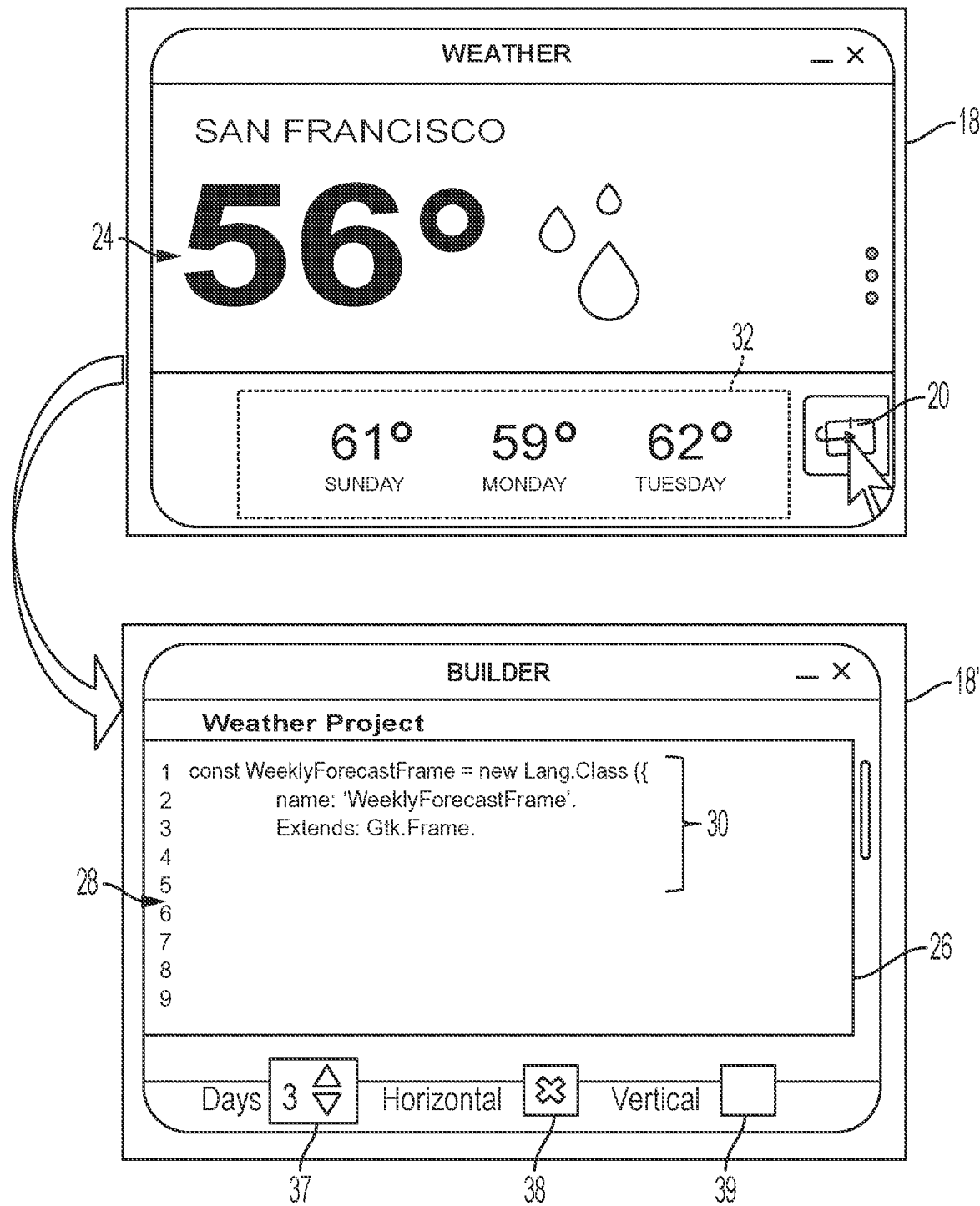
FIG. 2 schematically illustrates the window of the system of FIG. 1 transitioning from the first configuration to the second configuration.
Figure 3:
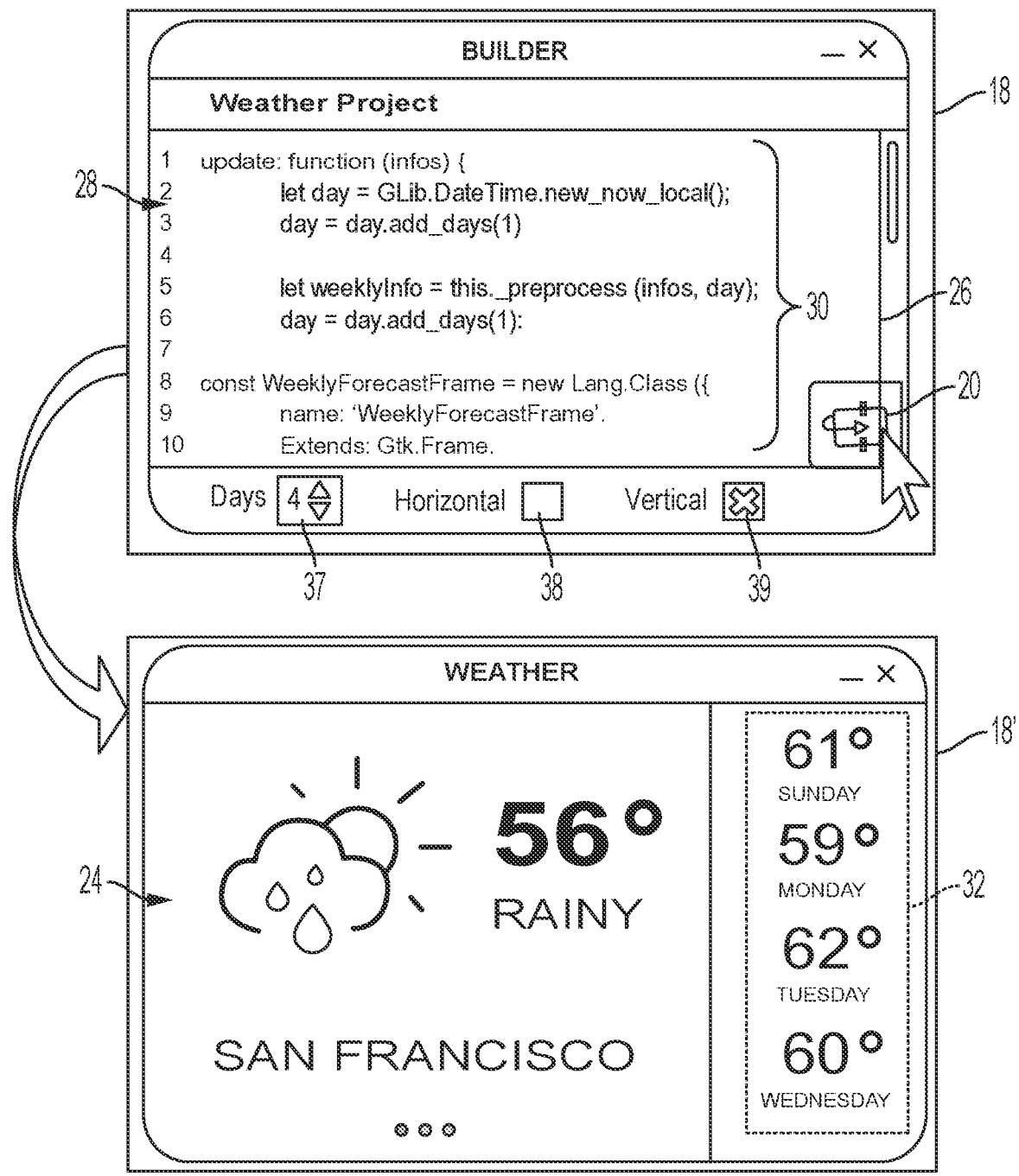
FIG. 3 schematically illustrates the window of the system of FIG. 1 transitioning from the second configuration to the first configuration.

The application 24 can have various different types of features 32, each with different types of parameters that can be changed using the editor 26. In the first embodiment (see FIGS. 1-3), the feature 32 is an information bar providing weather forecasts for a particular number of days in the future. One parameter of the feature 32 that is changeable via programming is the number of weather forecasts displayed in the information bar. Another parameter of the feature 32 that is changeable via programming is the orientation (either horizontal or vertical) of the information bar in the window 18. FIGS. 2 and 3 depict how the code listing 30 is changed in the editor 26 to increase the number of weather forecasts displayed in the information bar from three (3) to four (4). In the second embodiment (see FIGS. 5-7), the application includes several features 32a-c in the form of a shapes that are displayed within the interactive workspace. Each of the features 32a-c includes several parameters (e.g., size and color) that can be changed via programming.

The features 32 and changeable parameters thereof are not limited to those shown in the illustrated embodiments. Instead, the feature 32 can be anything displayable in the window 18, and the parameters can be any characteristic of the feature 32 that can be changed in a manner perceivable by the user. For example, in some embodiments, the feature 32 could be a character, a user tool, and/or displayed information. Additionally or alternatively, the feature 32 could relate to the user interface or operation of the application 24 itself, such as the physics of a game environment. In some embodiments, the parameter of the feature 32 could be a shape, a color, a font, a style, an ornamental parameter, and/or the present or absence of the feature 32. There is no inherent limit on the number of features 32 that may be present in the application 24, and there is no limit on the number of changeable parameters that each feature 32 may possess.

Figure 4A:
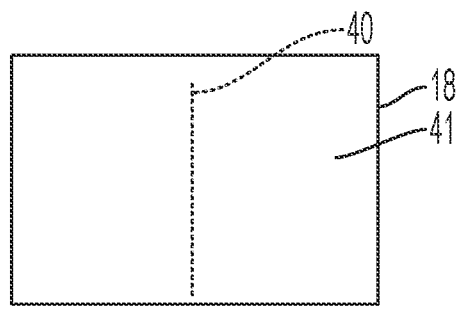
FIG. 4A-4H schematically depicts how the window of the system of FIG. 1 appears to rotate or flip about a vertical axis during transition between the first configuration (showing the application) and the second configuration (showing the programming interface).
Figure 4E:
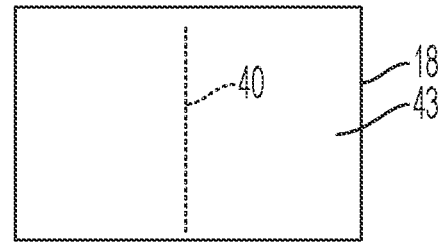
Figure 4B:
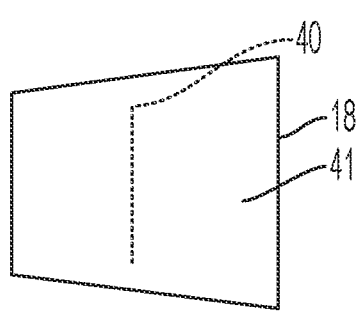

The layout and functionality of the programming interface 28 and the editor 26 displayed therein can vary depending on the particular application. In some embodiments, the programming interface 28 is designed to permit manual editing (e.g., adding, deleting, changing) of the code listing 30 by the user. Additionally or alternatively, the programming interface 28 can include at least one parameter input 37, 38, 39 (e.g., radio buttons, switches, toggles, drop downs, etc.) that a user interacts with to change a parameter of a feature 32 displayed in the application 24. In some such embodiments, the programming interface 28 is configured to automatically edit (e.g., add, delete, change) a code listing 30 in the editor 26 that corresponds with the user's interaction with one or more of the parameter inputs 37, 38, 39. In the first embodiment (see FIGS. 1-3), the programming interface 28 includes a first parameter input 37 in the form of up and down arrows for adjusting the number of weather forecasts displayed in the information bar, a second parameter input 38 in the form of a check box for selecting a horizontal orientation of the information bar (see FIGS. 1-3), and a third parameter input 39 in the form of a check box for selecting a vertical orientation of the information bar (see FIGS. 4A and 4B). In the second embodiment (see FIGS. 5-7), the programming interface 28 includes a first parameter input 37 for adjusting a size of a feature 32b selected for editing, and a second parameter input 38 for adjusting a color of a feature 32b selected for editing.

In some embodiments, the layout and functionality of the programming interface 28 can be based on the user's level of programming sophistication. For example, the layout and functionality of the programming interface 28 changes as the user's programming skills improve. An inexperienced user may initially only have access to a programming interface 28 that automatically edits code listings 30 based on the user's interaction with one or more parameter inputs 37, 38, 39. After the user's programming skills improve (e.g., as detected by the system 10), the layout and functionality of the programming interface 28 may adjust to permit manual editing of the code listing 30 by the user.

In some embodiments, the software 16 is further executable by the computer 12 to generate a sub-window 42 on the display 14, and the editor 26 is displayed in the sub-window 42. In the embodiment illustrated in FIGS. 5-7, for example, a sub-window 42 is displayed within the window 18 only when the window 18 is in the second configuration (see FIGS. 6 and 7). The sub-window 42 and the editor 26 displayed therein can switched between a minimized state (see FIG. 6) and an opened stated (see FIG. 7). The ability to minimize the sub-window 42 having the editor 26 allows the user to quickly view the application 24 (or a mirror image thereof) without having to switch the window 18 from the second configuration back to the first configuration.

Figure 4F:
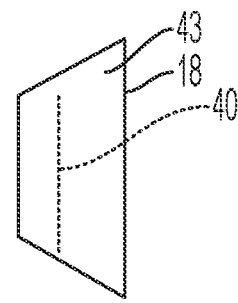
Figure 4C:
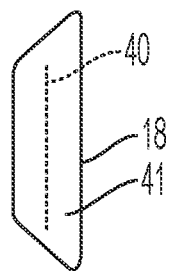
Figure 4G:
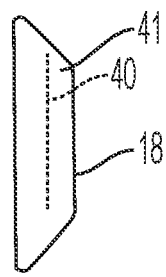
Figure 4D:
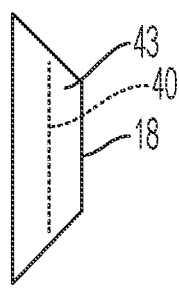
Figure 4H:
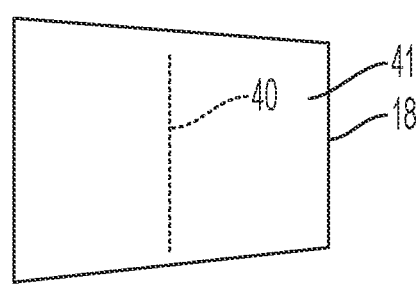
Figure 5:
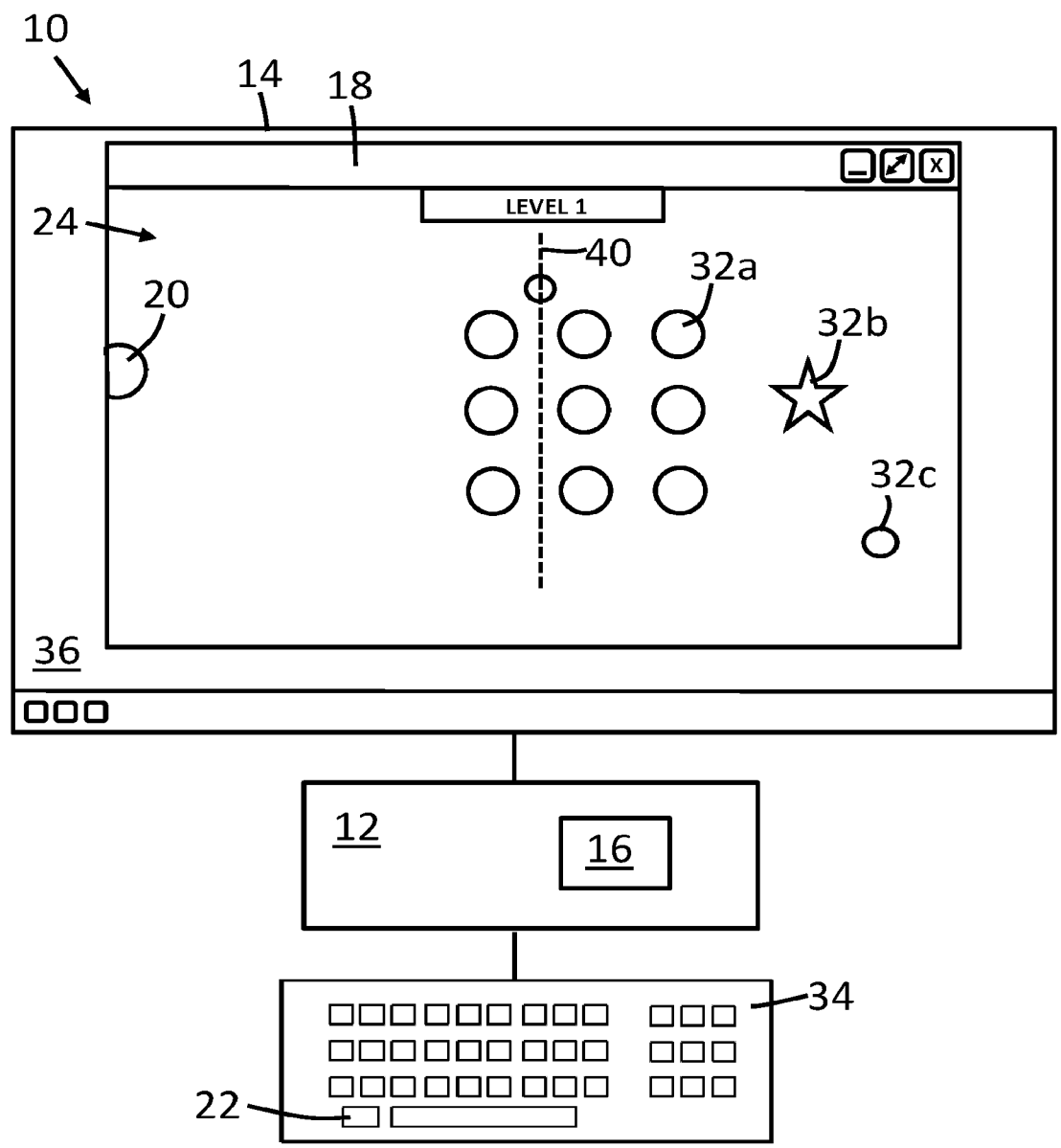
FIG. 5 schematically illustrates another system for teaching computer programming, and depicts the window thereof in the first configuration.
Figure 6:
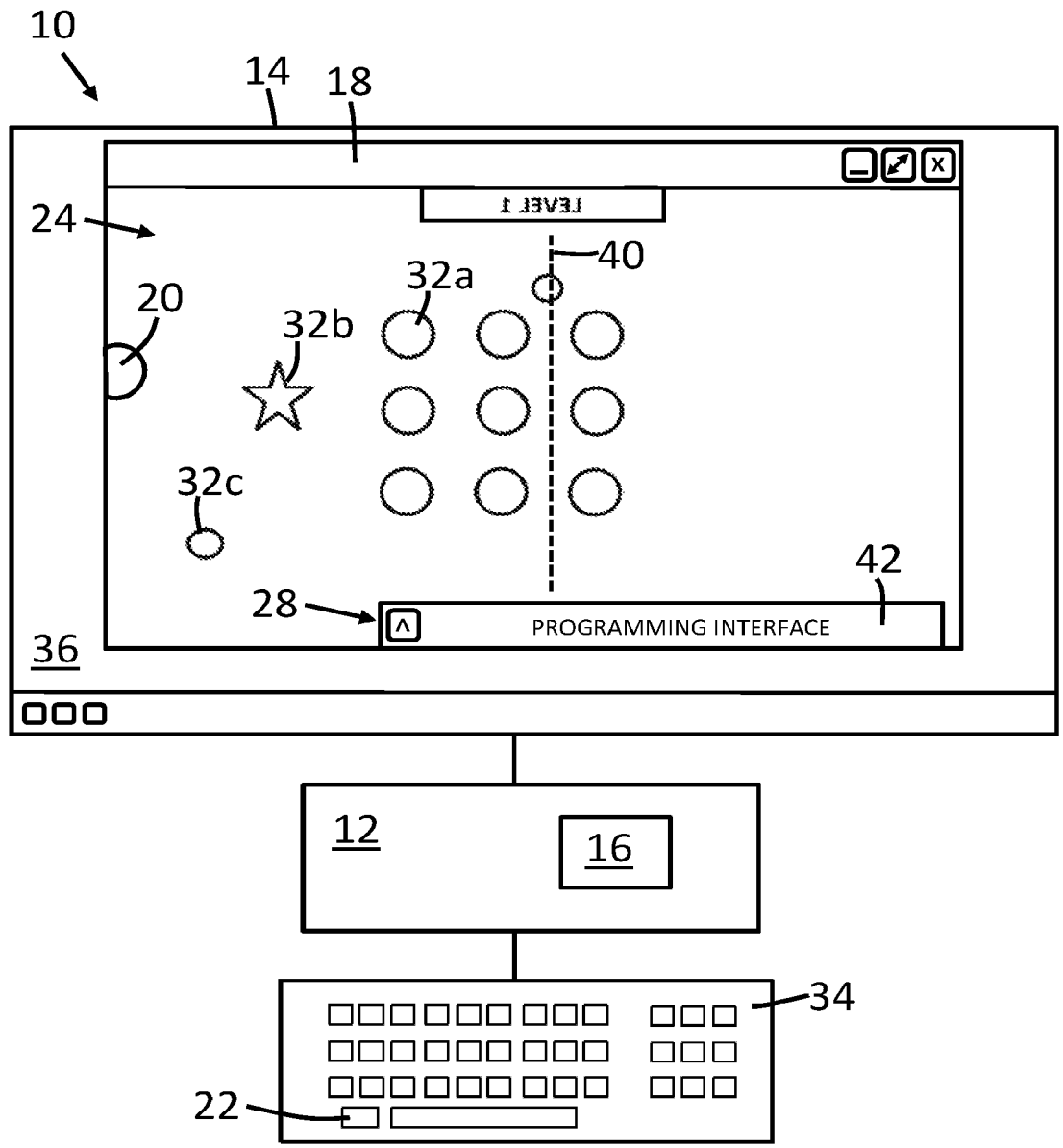
FIG. 6 schematically illustrates the system of FIG. 5 and depicts the window thereof in the second configuration and with the programming interface minimized.
Figure 7:
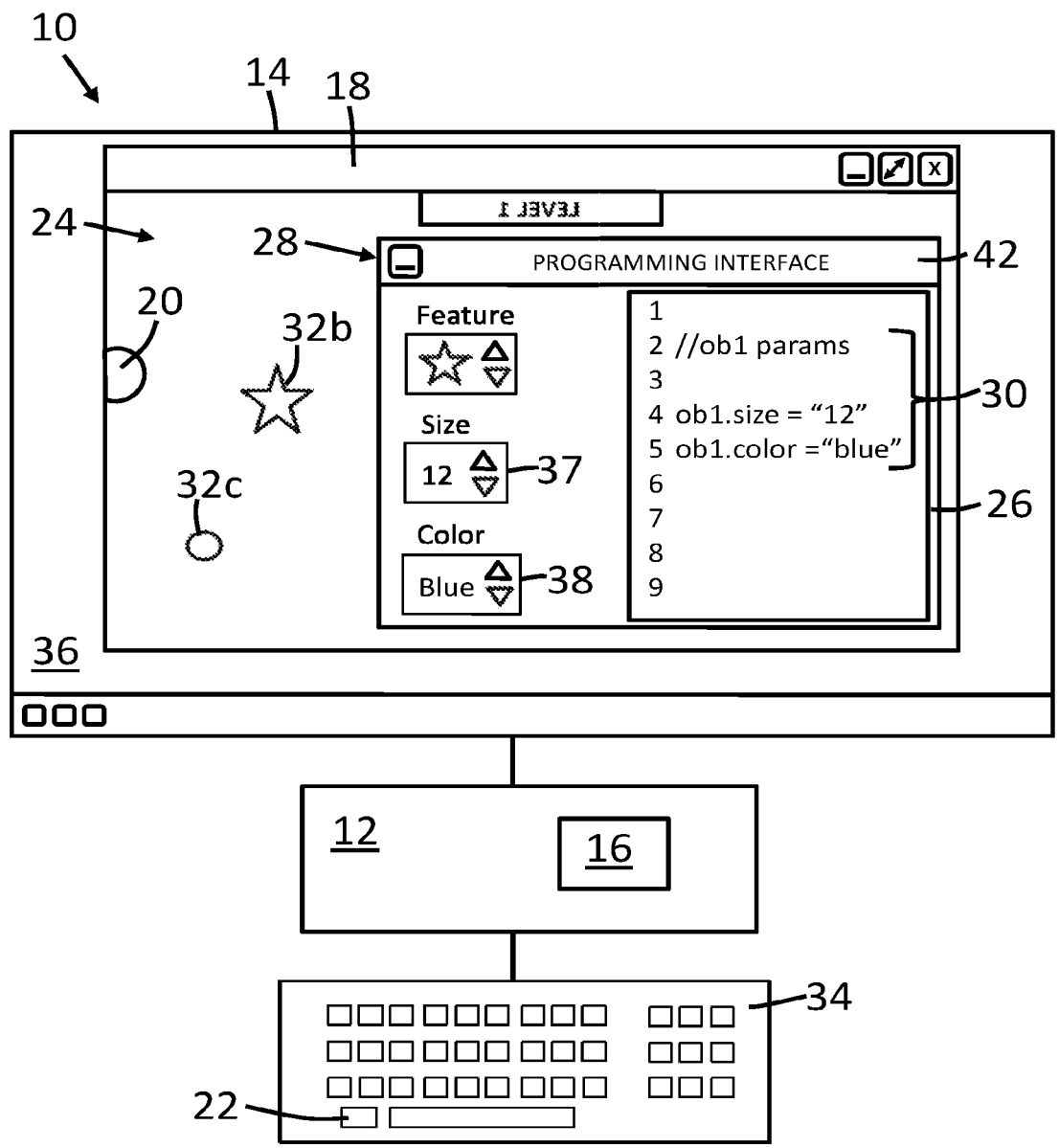
FIG. 7 schematically illustrates the system of FIG. 5 and depicts the window thereof in the second configuration and with the programming interface opened.

The manner in which the window 18 transitions between the first and second configurations helps to reinforce the concept that the programming changes are being made to the code underlying the application 24 itself. This in turn helps users (especially children) learn programming. In the illustrated embodiments, the window 18 rotates about an axis 40 during transition between the first configuration and the second configuration. In the illustrated embodiments, for example, the window 18 rotates about a vertical axis 40 extending orthogonally between a top edge and an opposing bottom edge of the window 18. As shown in the sequence of images in FIGS. 4A-4H, the window 18 appears to flip (i.e., perform a 3D rotation) about the vertical axis 40 during transition between the first configuration and the second configuration. During the rotation shown in FIGS. 4A-4C, a front side 41 of the window 18 displaying the application 24 (see FIGS. 1-3) faces the user. During the continued rotation shown in FIGS. 4D-4F, a back side 43 of the window 18 displaying the programming interface 28 (see FIGS. 1-3) faces the user. During the continued rotation shown in FIGS. 4G-4H, the front side 41 of the window again faces the user. In other embodiments, the window 18 can appear to fade away and fade back in, fly out of view and fly back into view, or perform some other animation during transition between the first configuration and the second configuration. In some embodiments, the system 10 can include more than one display, and the window 18 can move between a first display and a second display during transition between the first configuration and the second configuration.

In some embodiments, the concept that the programming changes are being made to the code underlying the application 24 is even further reinforced by having the window 18 in the second configuration display a mirror image of at least a portion of the application 24 displayed in the window 18 in the first configuration. This feature can be seen by comparing FIGS. 5 and 6, for example. In that embodiment, the window 18 appears to rotate about the vertical axis 40 during transition between the first configuration (see FIG. 5) and the second configuration (see FIG. 6), and the window 18 in the second configuration appears to be a mirror image of the window 18 in the first configuration.

Another aspect of the present invention involves a method that includes the steps of: (i) executing the software 16 to generate a window 18 on a computer display 14; (ii) providing at least one user input 20, 22 for transitioning the window 18 between a first configuration, in which the window 18 displays an application 24, and a second configuration, in which the window 18 displays a programming interface 28 for the application 24; (iii) displaying a feature 32 in the application 24; (iv) changing a code listing 30 related to a parameter of the feature 32; (v) transitioning between the first configuration and the second configuration via the user input 20, 22; and (vi) observing how differences in the code listing 30 affects the parameter of the feature 32 in the application 24.

As will be apparent in view of the above-described functionality of the system 10 and the various components thereof, the steps of the method can include various substeps, and/or various other steps in addition to the above-described steps. Although the steps of the method are set forth in a particular order using numeric and/or alphanumeric labels, the labels are used merely for convenient identification of steps, and are not intended to imply, specify, or require a particular order of carrying out such steps. Furthermore, in some embodiments, the method can include more or less steps than those discussed herein.

The present disclosure describes aspects of the invention with reference to the exemplary embodiments illustrated in the drawings; however, aspects of the invention are not limited to the exemplary embodiments illustrated in the drawings. It will be apparent to those of ordinary skill in the art that aspects of the invention include many more embodiments. Accordingly, aspects of the invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A system for teaching computer programming, comprising:
    a computer;
    a display connected to the computer;
    software executable by the computer to generate a window on the display;
    a user input for transitioning the window between a first configuration, in which the window displays an application, and a second configuration, in which the same window displays a programming interface for the application;
    a feature displayed in the application;
    an editor displayed in the programming interface, the editor for changing at least one line of code related to a parameter of the feature;
    wherein changing the at least one line of code related to the parameter of the feature and transitioning between the first configuration and the second configuration enables a user to observe how differences in the at least one line of code affects the parameter of the feature in the application; and wherein the application is displayed to the user only when the window is in the first configuration, and the programming interface is displayed to the user only when the window is in the second configuration.

2. The system of claim 1, further comprising a keyboard connected to the computer;

wherein the user input is a button on the keyboard.

3. The system of claim 1, wherein the user input is a soft button displayed in the window.

4. The system of claim 1, wherein the feature is displayed only in the application, and the editor is displayed only in the programming interface.

5. The system of claim 1, wherein in the second configuration the window displays a mirror image of at least a portion of the application displayed in the window in the first configuration.

6. The system of claim 1, wherein the software is further executable by the computer to generate a sub-window on the display; and wherein the editor is displayed in the sub-window.

7. The system of claim 6, wherein the sub-window is displayed within the window only when the window is in the second configuration.

8. The system of claim 1, wherein the window is displayed on and is movable about a graphical user interface desktop.

9. The system of claim 1, wherein the window forms a graphical user interface desktop.

10. The system of claim 1, wherein the window rotates about an axis during transition between the first configuration and the second configuration.

11. The system of claim 10, wherein the axis is a vertical axis extending between a top edge and an opposing bottom edge of the window.

12. The system of claim 1, wherein the window appears to flip about a vertical axis during transition between the first configuration and the second configuration.

13. The system of claim 1, wherein the parameter is a visual parameter.

14. A system for teaching computer programming, comprising:
    a computer;
    a display connected to the computer;
    software executable by the computer to generate a window on the display;
    a user input for transitioning the window between a first configuration, in which the window displays an application, and a second configuration, in which the same window displays a programming interface for the application;
    a plurality of features displayed in the application;
    an editor displayed in the programming interface, the editor for changing respective lines of code related to respective parameters of the plurality of features;
    wherein changing the respective lines of code and transitioning between the first configuration and the second configuration enables a user to observe how differences in the respective lines of code affects the respective parameters of the plurality of features in the application; and
    wherein the application is displayed to the user only when the window is in the first configuration, and the programming interface is displayed to the user only when the window is in the second configuration.

15. A method for teaching computer programming, comprising:
    executing software to generate a window on a computer display;
    providing a user input for transitioning the window between a first configuration, in which the window displays an application, and a second configuration, in which the same window displays a programming interface for the application, the programming interface including an editor for changing at least one line of code related to a parameter of a feature displayed in the application, wherein the application is displayed to the user only when the window is in the first configuration, and the programming interface is displayed to the user only when the window is in the second configuration;
    displaying a feature in the application;
    changing at least one line of code related to a parameter of the feature;
    transitioning between the first configuration and the second configuration via the user input; and
    observing how differences in the code listing affects the parameter of the feature in the application.

16. A system for teaching computer programming, comprising:
    a computer;
    a display connected to the computer;
    software executable by the computer to generate a window on the display;
    a user input for transitioning the window between a first configuration, in which an entirety of the window displays an application, and a second configuration, in which the entirety of the same window displays a programming interface for the application;
    a feature displayed in the application;
    an editor displayed in the programming interface, the editor for changing at least one line of code related to a parameter of the feature;
    wherein changing the at least one line of code related to the parameter of the feature and transitioning between the first configuration and the second configuration enables a user to observe how differences in the at least one line of code affects the parameter of the feature in the application.

* * * * *